May 2, 1944. W. C. ELLIOTT 2,348,117
TUMBLING SCRAPER
Filed March 6, 1943 3 Sheets-Sheet 1

Inventor
Wm. C. Elliott

May 2, 1944.  W. C. ELLIOTT  2,348,117
TUMBLING SCRAPER
Filed March 6, 1943   3 Sheets-Sheet 2

Inventor
Wm. C. Elliott
Attorneys

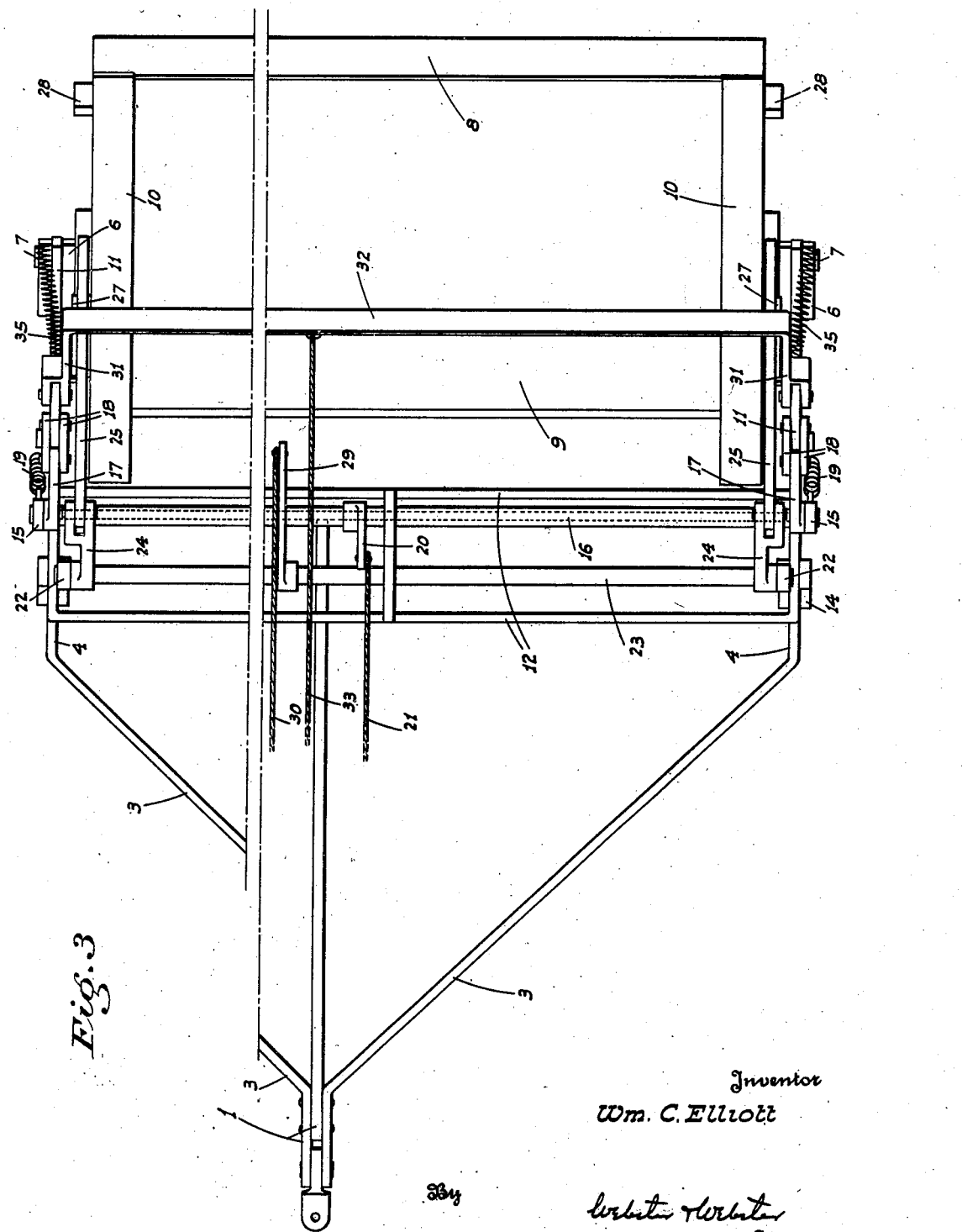

Patented May 2, 1944

2,348,117

UNITED STATES PATENT OFFICE 2,348,117

TUMBLING SCRAPER

William C. Elliott, Modesto, Calif.

Application March 6, 1943, Serial No. 478,305

7 Claims. (Cl. 37—140)

This invention relates to scrapers of the tumbling or Fresno type, and particularly to a tractor drawn scraper of this type adapted especially for orchard and similar use, to prepare irrigation checks or levees between the trees.

With tractor drawn scrapers of this type as ordinarily constructed and controlled, it is impossible to obtain any great depth of cut or to prevent mutilation of a check or levee already made by the scraper when subsequently passing over the same.

The objects of this invention are to provide a tumbling scraper so constructed and controlled that the bowl may be readily set for any desired depth of cut; the bowl may be instantly released so that it will return to its normal non-digging position or be actually pulled back to such position if necessary, and the bowl may be separately released for tumbling to discharge or spread the load irrespective of any digging position to which it may have been previously set; all operations being controlled by the operator of the tractor.

Another object of the invention is to provide control and actuating mechanisms for the purpose so arranged that they operate by pull or tension, thus making practical the use of lighter parts than would otherwise be the case, while avoiding the possible buckling or collapse of any part.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a top plan view of the scraper foreshortened.

Figure 4 is an enlarged fragmentary cross section on the line 4—4 of Fig. 1.

Referring now more particularly to the characters of reference on the drawings, the scraper comprises a draft frame 1 adapted at its forward end for connection at a definite fixed level with the drawbar 2 of a tractor.

Figure 1:
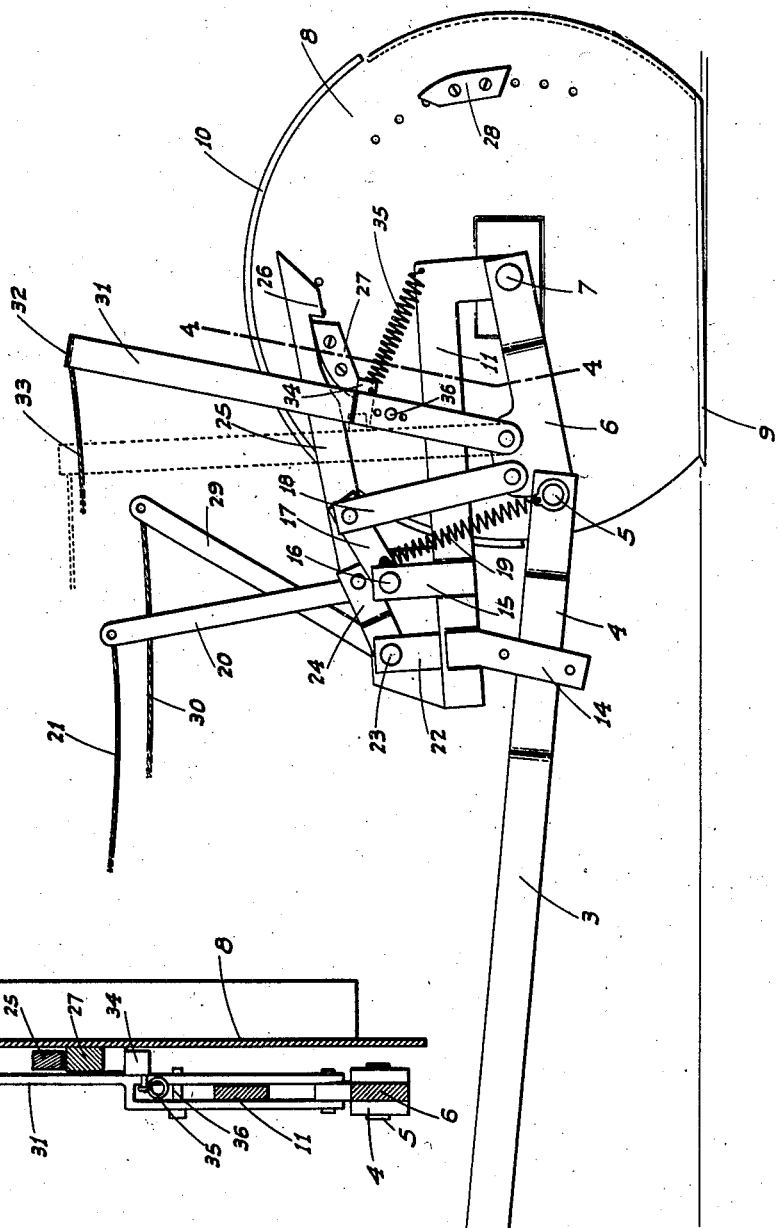
Figure 1 is a side elevation of my improved scraper in its normal or substantially non-digging position.

The frame includes side arms 3 diverging from its forward end and terminating at their rear end in straight portions 4 which are pivoted at their rear end as at 5 on the forward end of links 6 which form part of the draft unit. These links at their rear end are pivoted on trunnions 7 projecting from the sides of the bowl 8. This bowl is of conventional form and includes a flat bottom 9 having a cutting edge across its ends and ground engaging shoes or runners 10 above the bottom and concentric with the trunnions. The draft arms and links are normally broken somewhat below a dead-center position as shown in Fig. 1.

Pivoted at their rear end on the trunnions 7 independently of the links 6 are the side members 11 of a forwardly projecting auxiliary frame, said members being above and overhanging the straight portions 4 of the draft frame and said auxiliary frame including horizontal spaced cross bars 12.

The auxiliary frame is supported from the draft frame while allowing of relatively horizontal sliding movement by rollers 13 engaging the frame arms 4 above and below (see Fig. 2) and mounted in brackets 14 depending from the arms 11.

Journaled in brackets 15 upstanding from the arms 11 is a cross shaft 16 on which are fixed rearwardly projecting arms 17. Links 18 connect these arms and the draft links 6 adjacent the forward end of the latter. Tension springs 19 connect the brackets 15 and the arms 4 adjacent the pivots 5. A pull lever 20 projects upwardly from the shaft 16 at a normal slightly forward slant and has a forwardly projecting pull cable 21 connected thereto.

Journaled in other brackets 22 on the arms 11 is another cross shaft 23 on which are secured rearwardly projecting arms 24. Pivoted on and projecting rearwardly from the arms 24 are pull bars 25 which are formed adjacent their rear ends with depending catch stops 26; the arms and bars being disposed with a normal break above dead-center position. These bars extend just outside the sides of the bowl and rest of themselves on lugs 27 secured on the sides of the bowl for circumferential adjustment thereon relative to the trunnions 7; the stops 26 being adjacent but rearwardly of the lugs. The lugs 27 are positioned for engagement by the bar stops in the normal or digging position of the scraper; similar lugs 28 being adjustably mounted on the bowl rearwardly of the lugs 27 relative to the direction of tumbling rotation of the bowl, for engagement by the bar stops when the scraper bowl is in a slanting position. A lever 29 normally disposed with a rearward slope, projects upwardly from the shaft 23 and has a forwardly extending pull cable 30 connected thereto.

Pivoted on the links 6 rearwardly of the links 18 are upstanding levers 31 connected at the top as a unit and on a level above the levers 20 and 29 by a cross bar 32 which has a forwardly projecting pull cable 33 connected thereto. The levers extend outwardly of the bars 25 and the lugs 27 and 28, and intermediate their ends are provided with rigid stop blocks 34 adapted to project under the forward end of the lugs 27 or 28 and then preventing rotation of the bowl in a forward direction relative to the frames. Tension springs 35 connect the levers 31 and the arms 11 and tend to swing the levers rearwardly so as to normally maintain the blocks 34 under the lugs 27. The lower portions of the levers 31 straddle the auxiliary frame arms 11 as shown in Fig. 4, and cross pins 36 are adjustably mounted in the levers above and extend over the arms 11.

Figure 2:
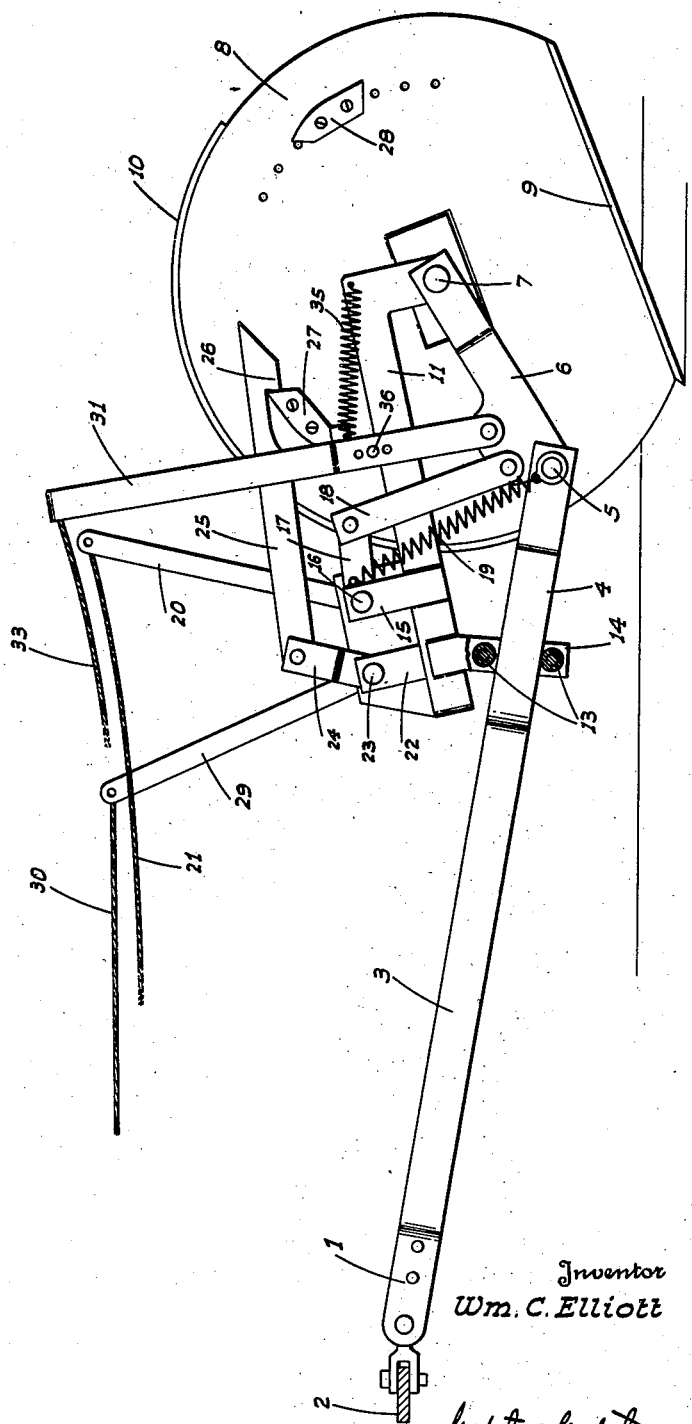
Figure 2 is a similar view showing the bowl as tilted for relatively deep digging.

In operation, when the scraper is in its normal position, or as shown in Fig. 1, forward pull on the draft frame will cause the bowl to dig but lightly or to "skin" the surface. When a deeper cut is desired it is only necessary for the tractor operator to pull on the cable 30. This pulls the lever 29 forwardly and raises the arms 24. This in turn pulls forwardly on the bars 25 and since the stops 26 on the latter are constantly engaged with the lugs 27, the bowl is rotated forwardly, lowering the front edge of the bottom plate 9 to a deeper position relative to the trunnions 7. At the same time, since the lugs 27 are engaged with the stop blocks 34, the links 6 are swung down about the trunnions 7 and the pivots 5 are also lowered. The draft arms therefore become broken below dead-center position to a greater extent than is normally the case, or as shown in Fig. 2. A pull on the draft frame from its forward end therefore always tends to straighten the draft arms; a tendency which is restrained as long as a deep cut is desired, by the operator maintaining his pull on the cable 30. When it is desired to restore the bowl to its normally shallow digging position, it is usually only necessary to release the pull on the cable 30, when the straightening-up tendency of the draft arms above mentioned will be effective to swing the bowl up. If, however, due to certain ground conditions this does not take place the bowl may be positively returned to its normal position by a pull on cable 21. Such a pull swings lever 30 forwardly, raising the arms 17 and pulling up on the links 18. Since these links are connected to the rear links 6 of the draft unit, such links 6 are necessarily pulled up to a normal position. In any case this movement of course is aided by the tension springs 19.

When it is desired to cause the bowl to rotate to a spreading or dumping position, it is only necessary for the operator to pull the cable 33. This pull swings the levers 31 forwardly and moves the blocks 34 out from under the lugs 27, enabling the bowl to then rotate forwardly without restriction. If a spreading action is desired the levers are released before the lugs 28 reach a stop block engaging position. If a full dumping rotation of the bowl is desired the pull on the cable 31 is maintained until the lugs 28 pass beyond said blocks. When the levers 31 are thus moved clear of the lugs the blocks 34 then serve to temporarily support the pull bars 25 and prevent the latter from dropping to a position where they would fail to be in the path of the lugs for subsequent re-engagement thereby.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patents is:

1. A scraper comprising a draft frame adapted to be supported at a fixed level at its forward end, and including rigid side arms and links pivoted on and extending rearwardly from the arms, the links and arms being normally disposed in a predetermined position relative to each other; a bowl pivoted on the links at their rear end for rotation in the frame, a releasable holding connection between the links and bowl normally preventing forward rotation of the bowl relative to the links and maintaining the bowl in a predetermined position relative thereto and actuating means applied to the bowl to positively turn the same forwardly whereby when the connection is engaged, to break the arms and links downwardly at their pivotal connection.

2. A scraper as in claim 1, with a spring acting on the links and arms tending to raise the same to a predetermined normal position when the actuating means is not in operation whereby to restore the bowl to said predetermined position.

3. A scraper as in claim 1, with a spring acting on the links and arms tending to raise the same to a predetermined normal position when the actuating means is not in operation whereby to restore the bowl to said predetermined position, and separate manually actuated means to positively raise the links and arms to such normal position.

4. A scraper comprising a draft frame adapted to be supported at a fixed level at its forward end, and including rigid side arms, and links pivoted on and extending rearwardly from the arms, the links and arms being normally disposed in a predetermined position relative to each other; a bowl pivoted on the links at their rear end for rotation in the frame, a lever pivoted on and upstanding from one link, a lug on the corresponding side of the bowl above and offset from the pivot thereof, the lever including a stop normally engaging the forward end of the lug to prevent forward rotation of the bowl relative to the links, means to swing the lever to a position clear of the lug, a forwardly projecting bar overhanging and engaging the lug on its rearward face and means to pull the bar forwardly.

5. A scraper comprising a draft frame adapted to be supported at a fixed level at its forward end, and including rigid side arms, and links pivoted on and extending rearwardly from the arms, the links and arms being normally disposed in a predetermined position relative to each other; a bowl pivoted on the links at their rear end for rotation in the frame, a lever pivoted on and upstanding from one link, a lug on the corresponding side of the bowl above and offset from the pivot thereof, the lever including a stop normally engaging the forward end of the lug to prevent forward rotation of the bowl relative to the links, means to swing the lever to a position clear of the lug, a forwardly projecting bar overhanging and engaging the lug on its rearward face, an auxiliary frame supported at its rear end axially of the bowl and at its forward end in relatively slidable connection with the draft arms, a lever mounted on and upstanding from the auxiliary frame and connecting means between the lever and bar to pull the latter forwardly.

6. A scraper comprising a draft frame adapted to be supported at a fixed level at its forward end, and including rigid side arms, and links pivoted on and extending rearwardly from the arms, the links and arms being normally disposed in a predetermined position relative to each other; a bowl pivoted on the links at their rear end for rotation in the frame, a lever pivoted on and upstanding from one link, a lug on the corresponding side of the bowl above and offset from the pivot thereof, the lever including a stop normally engaging the forward end of the lug to prevent forward rotation of the bowl relative to the links, means to swing the lever to a position clear of the lug, a forwardly projecting bar overhanging and engaging the lug on its rearward face, the bar at its rear end normally resting of its own weight on the lug and means to pull the bar forwardly and pivotally supporting the same at its forward end; the stop being disposed relative to the bar so that when the lever is swung clear of the lug and the latter rotates with the bowl and away from the bar, the latter is supported by the stop against undue dropping movement.

7. A scraper as in claim 5 with another lever mounted on the auxiliary frame and connection means between the last named lever and the draft frame to raise the links and arms thereof to a normal position after being lowered.

WILLIAM C. ELLIOTT.